United States Patent [19]
Dempsey

[11] 3,798,542
[45] Mar. 19, 1974

[54] ENERGY MEASURING DEVICE FOR PULSE TYPE DEFIBRILLATORS

[76] Inventor: Robert H. Dempsey, 2505 Oak St., Napa, Calif. 94558

[22] Filed: July 5, 1972

[21] Appl. No.: 269,057

Related U.S. Application Data

[63] Continuation-in-part of Ser. No. 27,884, April 13, 1970, abandoned.

[52] U.S. Cl............. 324/133, 128/419 D, 324/111, 324/132
[51] Int. Cl....................... G01r 21/00, G01r 19/16
[58] Field of Search ............ 324/29.5, 51, 111, 119, 324/122, 132, 133; 340/248 P, 249, 253; 320/25; 128/419 D

[56] References Cited
UNITED STATES PATENTS

| | | | |
|---|---|---|---|
| 3,281,689 | 10/1966 | Schneider et al. | 324/132 |
| 3,458,811 | 7/1969 | Greibach | 324/132 |
| 3,348,120 | 10/1967 | Geyger | 328/144 |
| 2,763,837 | 9/1956 | Follingstad | 324/132 |
| 3,271,673 | 9/1966 | Woroble | 324/122 X |
| 3,241,555 | 3/1966 | Caywood et al. | 128/419 D |

OTHER PUBLICATIONS

Herrod et al., Control of Heart Action by Repetitive Electrical Stimuli, Annals of Surgery, Vol. 136, No. 3, Sept. 1952.

*Primary Examiner*—Gerard R. Strecker
*Attorney, Agent, or Firm*—Naylor, Neal & Uilkema

[57] ABSTRACT

Apparatus and method for testing the energy output of a defibrillator or the like comprising a pair of contacts, a resistance element electrically connected between said contacts, a threshold monitoring device electrically connected between said contacts and parallel with the resistance element, and indicator means electrically connected to the threshold monitoring device for indicating when the energy output of the defibrillator exceeds a predetermined value.

9 Claims, 2 Drawing Figures

PATENTED MAR 19 1974　　　　　　　　　　　3,798,542

INVENTOR.
ROBERT H. DEMPSEY
BY Naylor & Neal
ATTORNEYS

ENERGY MEASURING DEVICE FOR PULSE TYPE DEFIBRILLATORS

This is a continuation-in-part of application Ser. No. 27,884, filed Apr. 13, 1970, now abandoned.

BACKGROUND OF THE INVENTION

The present invention relates to the art of testing the operation of electrical equipment, and more particularly, to an apparatus and method for testing defibrillator equipment.

In the treatment of certain cardiac conditions, defibrillators are utilized to impart to the patient a high intensity, short duration shock. Since activity of this nature is often carried out under emergency conditions, often with the patient's life in jeopardy, it is quite important that the defibrillator equipment operate properly at the time it is first applied to the patient.

SUMMARY OF THE INVENTION

It is therefore an object of the present invention to provide an apparatus of relatively simple and inexpensive construction which is readily adapted for use with defibrillator equipment to indicate to the operator when the electrical energy output of said equipment exceeds a predetermined value.

It is a further object of the present invention to provide a method for testing defibrillator equipment or the like, which may be carried out readily and quickly.

It is yet another object of the present invention to provide a defibrillator tester which does not require an external power source for the proper operation thereof, said operation being accomplished solely by means of the electrical energy imparted to the tester by the defibrillator equipment.

These and other objects have been attained in accordance with the teachings of the present invention by providing an apparatus and method for testing the energy output of equipment, such as a defibrillator. According to the invention, a pair of electrically conducting contacts are provided, which are adapted to be engaged by the output paddles of the equipment. Electrically connected between the contacts in parallel with one another are a resistance element and a threshold monitoring device. The resistance element, which has a resistance approximating that of the trans-thorax impedance of the human body, is utilized as a dummy load to absorb the output of the defibrillator equipment or the like so that the threshold monitoring device will operate properly. An indicator means, such as an electric lamp, is electrically connected to the threshold monitoring device for indicating to the operator when the electrical output of the equipment exceeds a predetermined value.

DESCRIPTION OF THE DRAWINGS

The above-noted and other objects of this invention will be understood from the following description taken with reference to the drawings wherein.

DESCRIPTION OF THE ILLUSTRATED EMBODIMENT

Figure 1:
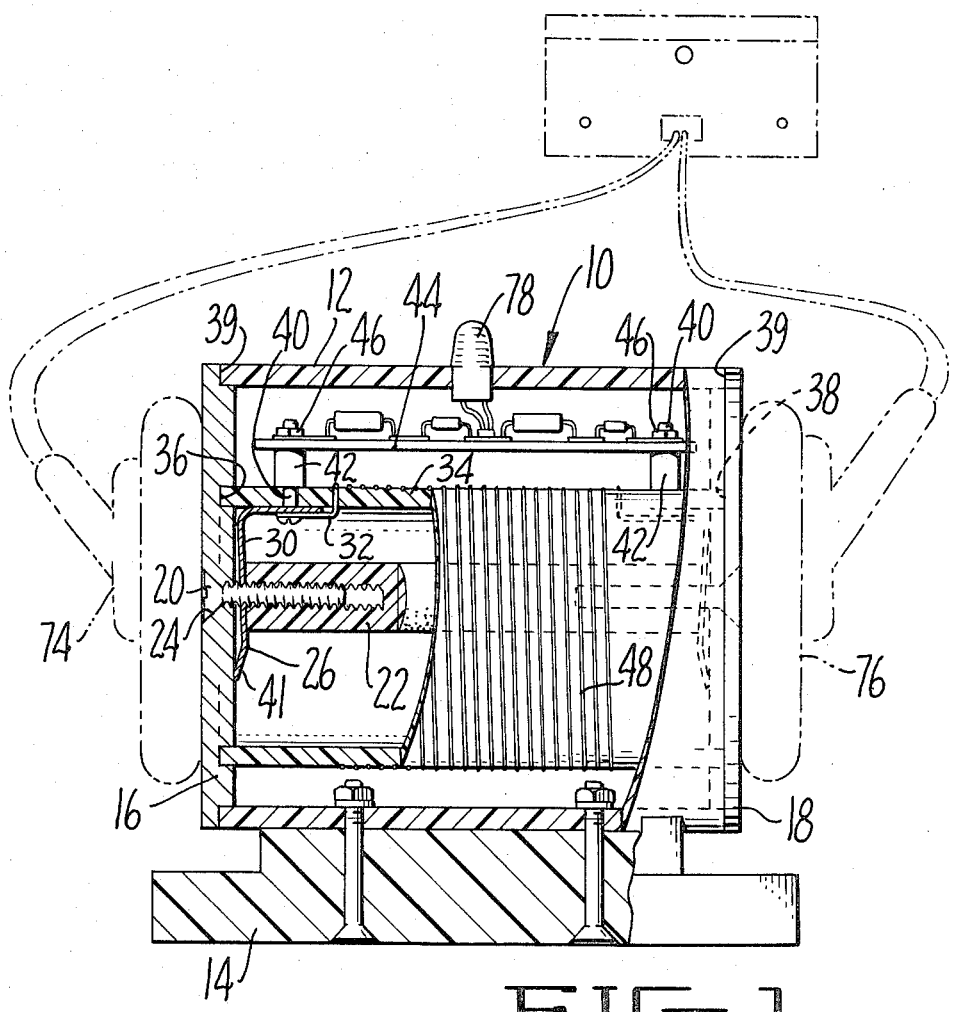
FIG. 1 is a front elevational view of a defibrillator tester constructed in accordance with the teachings of the present invention with portions thereof broken away.

Referring now to FIG. 1, a defibrillator tester constructed in accordance with the teachings of the present invention is generally designated by means of reference numeral 10. The tester includes a generally cylindrically shaped open-ended housing 12 which is secured by any desired expedient, such as by means of bolts and nuts, to a base 14. Preferably, housing 12 and base 14 are constructed of a non-conducting material which may be plastic, for example.

Secured over the open ends of housing 12 are contact plates 16 and 18, which are constructed of a suitable electrically conducting material. Each of the contact plates has formed therein a centrally disposed aperture through which a screw projects inwardly into the interior defined by housing 12. Only one such screw, i.e., screw 20, is illustrated in detail; however, it should be readily understood that a similar screw projects through contact plate 18. Each of the screws has threads which are matingly engaged with cooperating threads formed in the ends of a cylindrical tie rod 22 which extends lengthwise within the interior of the housing. Tie rod 22 is constructed of a relatively rigid non-conducting material. One material that has been found satisfactory for use in the construction of the tie rod is laminated fiberglass. It will be readily appreciated that the screws extending between the contact plates and the tie rod, e.g., screw 20, maintain the contact plates in tight engagement with the outer circular edges of housing 12, since the heads of the screws are somewhat larger than the apertures of the contact plates through which they extend. The contact plates are preferably counter sunk as at 24 in conformance with the shape of the enlarged heads of the screws so that a substantially smooth outer surface is presented by the contact plates. The screws associated with the contact plates are constructed of a suitable electrically conducting material which may be the same as that employed in the construction of contact plates 16 and 18, for example.

Positioned between each contact plate and the associated end of tie rod 22 is an L-shaped bracket, only one of which, i.e., bracket 26, is shown in detail. The screws which extend between contact plates 16 and 18 and cylincrical tie rod 22 also pass through an aperture formed in the upstanding legs of each of the L-shaped brackets. In bracket 26, for example, this upstanding leg is designated by means of reference numeral 30. L-shaped bracket 26, as does the other L-shaped bracket, also includes an inwardly extending horizontally disposed leg 32. Positioned upon the horizontally disposed bracket legs is an open-ended insulator cylinder 34 which is substantially coaxial with and disposed in spaced relationship to cylindrical tie rod 22. Laminater fiberglass has been found to be a material suitable for use in the construction of insulator cylinder 34. When the contact plates 16 and 18 are secured to cylindrical tie rod 22 in engagement with the outer circular edges of housing 12, circular-shaped recessed portions 36 and 38 formed in the contact plates accomodate the ends of the insulator cylinder, as shown. In like manner, the ends of housing 12 are positioned in circular outer grooves 39 formed about the periphery of the contact plates as shown. With this arrangement proper spacing between the various constituent elements of the tester is insured. The upstanding bracket legs are bent outwardly as at 41 so that they are in direct engagement with the contact plates.

Projecting upwardly through aligned apertures formed in the horizontally disposed bracket legs and insulator cylinder 34 are bolts 40. Extending about bolts 40 and positioned upon the insulator cylinder are spacers 42. The uppermost ends of bolts 40 extend through suitable apertures formed in a printed circuit board 44 and spacers 42 and nuts 46, which are threadedly engaged with the bolts, serve to maintain the printed circuit board 44 in spaced relationship with respect to the insulator cylinder 34.

Wound about the outer periphery of open-ended insulator cylinder 34 is a resistance in the form of a continuous length of resistance wire which may be, for example, nickle chromium wire. This resistance wire, which is designed by means of reference numeral 48, is connnected at one end to one bolt 40 and at its other end to the bolt 40 disposed at the other end of insulator cylinder 34. The bolts are constructed out of a suitable electrically conducting material. The brackets are also constructed of a suitable electrically conducting material. One material that has been found especially suitable for this latter purpose is a phosphor bronze alloy. In the tester 10 resistance wire 48 operates as a dummy load when the defibrillator equipment is being tested. The total resistance of wire 48 is chosen so that it approximates the trans-thorax impedance of the human body. It will be appreciated that when electrical charges of opposite polarities are applied to contact plates 16 and 18, a current will flow between the tester L-shaped brackets (by virtue of engagement of portions 41 with the plates) through wire 48.

Nuts 46 are also constructed of a suitable electrically conducting material and the nuts are secured into electrically conducting engagement with terminals (not shown) formed on the printed circuit board 44. It will be obvious, therefore, that the circuit of printed circuit board 44 is disposed in electrical parallelism with resistance wire 48. That is, a portion of the current passing through tester L-shaped brackets is conducted through bolts 40 and nuts 46 to the circuit board. In this manner, the defibrillator equipment output energy which is imparted to the tester is absorbed by the dummy load and the printed circuit receives current which is proportional to the voltage impressed across the tester.

Figure 2:
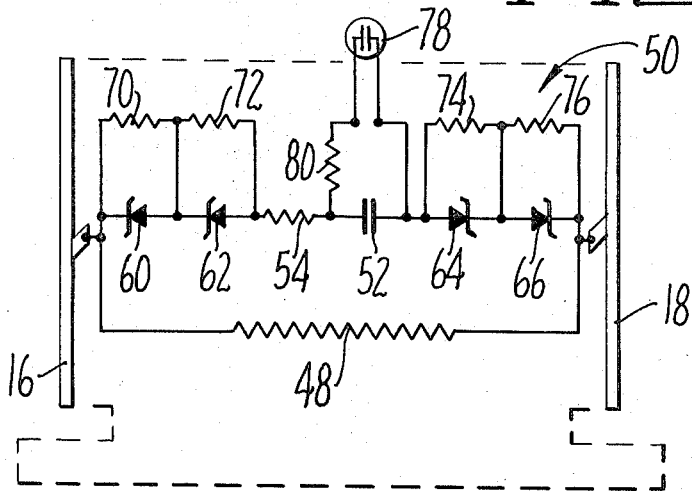
FIG. 2 is a diagramatic illustration of a preferred form of electrical circuitry employed in the tester of FIG. 1.

Referring now to FIG. 2, the circuitry employed in a defibrillator tester constructed in accordance with the present invention, is illustrated. Electrically connected in parallel with resistance wire 48 is the PC board circuitry. This circuitry, which is indicated generally by means of reference numeral 50, comprises the threshold monitoring device of the subject apparatus. More particularly, the PC board circuitry comprises a capacitor 52 which is disposed in series with a resistor 54 and a plurality of Zener diodes 60, 62, 64 and 66. It should be noted that the diodes to the left of capacitor 52, i.e., diodes 60 and 62, are disposed in a direction opposite to that of diodes 64 and 66 to the right of capacitor 52. Disposed in parallel with the diodes in the manner illustrated are resistors 70, 72, 74 and 76. The opposite disposition of the diode pairs in the circuit imparts to the tester a bi-polar input characteristic so that the hospital personnel need not be concerned with whcich defibrillator paddle engages each contact plate.

Upon application of the defibrillator equipment paddles, such as paddles 74 and 76 (FIG. 1), in direct engagement with contact plates 16 and 18, the associated defibrillator is actuated and a high energy charge passes from the paddles into the tester. Current will then flow through the resistor 48 and simultaneously through the PC board circuitry. For the purpose of illustration, it will be assumed that the electrical current flows from the left to the right in FIG. 2; however, as previously stated, due to the bi-polar characteristic of the defibrillator tester the current may just as well flow from the right to the left. During the initial surge of energy from the difibrillator, while the voltage is increasing from zero, current will pass through resistors 70, 72 and 54, and thence to capacitor 52. When the load voltage across resistor 48 increases to a certain predetermined value, Zener diode 60 will break down, allowing increased current therethrough without a further increase of voltage. Thus, as the load voltage continues to rise, the increase will be reflected across resistors 72 and 54, resulting in a greater increase of current through the circuit.

When the increasing load voltage reaches a second predetermined voltage, Zener diode 62 will break down, and futher increases in the load voltage will be reflected across resistor 54, again resulting in a greater increase in current through the circuit. Thus resistors 70, 72 and diodes 60, 62 cooperate to modify the normal RC characteristics of the circuit. The circuit components are chosen to produce a charging current on capacitor 52 proportional to the square of the load voltage. The integral of the capacitor charging current will thus be proportional to the energy absorbed by resistor 48, and the voltage on capacitor 52 will be proportional to the integral of the capacitor current.

When the voltage on capacitor 52 reaches a preselected value, proportional to the desired energy level, it will fire a neon signal light 78 in parallel with capacitor 52. Resistor 80 functions to prevent an excessive charge from being directed to the neon light by the capacitor.

capacitor 52 is selected so that it discharges only when the energy output of the associated defibrillator exceeds a predetermined value necessary for proper operation thereof. This may, for example, be in the order of 100 watt-seconds. The signal light 78 extends externally of housing 12 in the manner which may most clearly be seen with reference to FIG. 1. Upon observing the flashing of neon light 78 the operator is apprised that the defibrillator equipment has an energy output exceeding the predetermined value.

With reference to the foregoing description, it will be apparent to those skilled in the art, that various changes and modifications may be made to the illustrated embodiment without departing from the spirit of the invention or from the scope of the appended claims.

I claim as my invention:

1. Apparatus for testing the output energy of pulse-type equipment such as a defibrillator by imposing a resistive load and a time sensitive circuit across the output of the equipment, said apparatus comprising, in combination:

a pair of electrically conducting contacts adapted to be connected to the output of said equipment;

a resistive load element of pred-determined resistance electrically connected between said contacts;

a voltage squaring and integrating circuit electrically connected between said contacts and in parallel with said resistive load element, for providing a voltage signal which is approximately proportional to the integral of the square of the voltage on said resistive load and is thus proportional to the energy dissipated in said resistive load within the anticipated operating range of said pulse-type equipment, said circuit comprising:
1. a series of resistors and a capacitor series connected between said contacts; and,
2. a series of Zener diodes series connected to one another and parallel connected, respectively, to said respective resistors to successively breakdown and conduct around the resistors as the voltage on the load element increases so as to modify the charging current on the capacitor to be approximately proportional to the square of the voltage on the load element;

an indicator means electrically connected to said voltage squaring and integrating circuit for indicating to the operator when the voltage signal of said voltage squaring and integrating circuit, and thus the electrical energy output of said equipment, exceeds a predetermined value.

2. The apparatus according to claim 1 wherein said resistive load element has a predetermined resistance value substantially equal to the transthorax impedance of a human body, whereby said apparatus will measure the energy output of a defibrillator when used on a human body.

3. The apparatus according to claim 1 wherein said indicator means is connected in parallel with said capacitor.

4. The apparatus according to claim 1 wherein some of said resistors and the Zener diodes in parallel therewith are disposed between said capacitor and one of said contacts and the remainder of said resistors and the Zener diodes in parallel therewith are disposed between the capacitor and the other of said contacts, the polarity of said Zener diodes disposed between said one contact and said capacitor being in opposition to the polarity of said Zener diodes disposed between said capacitor and said other contact, whereby some of the Zener diodes are operating in a forward direction and some are operating in a reverse direction to give the apparatus a bi-polar characteristic modifying the charging rate of the capacitor.

5. Apparatus for testing the output energy of pulse-type defibrillator equipment having a pair of output paddles by imposing a resistive load and a voltage squaring and integrating circuit between the output paddles, said apparatus comprising, in combination:
an open-ended housing;
a pair of electrically conducting contact plates positioned over said open ends, said contact plates adapted to be engaged by said output paddles;
a resistive load element of predetermined resistance electrically connected between said contact plates and disposed within said housing and supported by said contact plates;
a circuit disposed within said housing and electrically connected between said contact plates in parallel with said resistive load element, for providing a voltage proportional to the integral of the square of voltage on said resistive load, said circuit comprising:
1. a series of resistors and a capacitor series connected between said plates; and,
2. a series of Zener diodes series connected to one another and parallel connected, respectively, to said respective resistors to successively breakdown and conduct around the resistors as the voltage on the load element increases so as to modify the charging current on the capacitor to be approximately proportional to the square of the voltage on the load element;

indicator means observable externally of said housing electrically connected to said circuit for indicating to the operator when the electrical energy output from said defibrillator paddles exceed a predetermined value.

6. Apparatus for use in testing the output energy of pulse-type defibrillator equipment, said apparatus comprising:
a pair of electrically conductive contacts adapted to be connected to the output of defibrillator equipment to receive the output energy thereof;
electrical load means connected between said contacts for absorbing the output energy received thereby from defibrillator equipment;
a voltage sensitive circuit electrically connected to said load means for providing a voltage proportional to the integral of the square of voltage on the load means whereby said circuit reflects the total energy input to the electrical load means, said circuit comprising:
1. a series of resistors and a capacitor series connected between said contacts;
2. a series of Zener diodes series connected to one another and parallel connected, respectively, to said respective resistors to successively breakdown and conduct around the resistors as the voltage on the load means increases so as to modify the charging current on the capacitor to be approximately proportional to the square of the voltage on the load means.

7. A method of testing the electrical output energy of pulse-type equipment for a pre-selected energy level, comprising the steps of:
providing a resistive load element of predetermined resistance,
directing the electrical output of said equipment through said load element,
producing a voltage signal that is approximately proportional to the energy dissipated in said load element by directing the load element voltage to an RC circuit having a capacitor and resistive means in series and Zener diodes in parallel combination with a portion of said resistive means whereby the charging current of the capacitor increases proportionally to the square of the load element voltage as the load element voltage increases to successive breakdown voltages of the respective Zener diodes and reduces the effective resistance of said circuit; and
monitoring said voltage signal for a voltage proportional to the energy level desired.

8. The method according to claim 7 wherein the pulse-type equipment is a defibrillator and the resistance of said load element is chosen to approximate the trans-thorax impedance of a human body.

9. The method according to claim 7 wherein the capacitor voltage is monitored by a neon tube for a preselected voltage that will ignite the tube proportional to the preselected energy level sought.

* * * * *